Jan. 20, 1948.  W. R MARSHALL  2,434,707
CONTINUOUS MILLING PROCESS AND APPARATUS
Filed Oct. 9, 1943  2 Sheets-Sheet 1
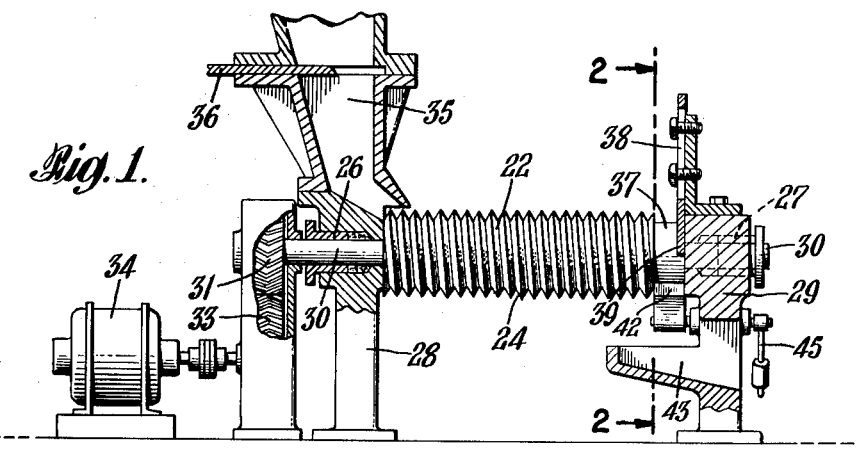
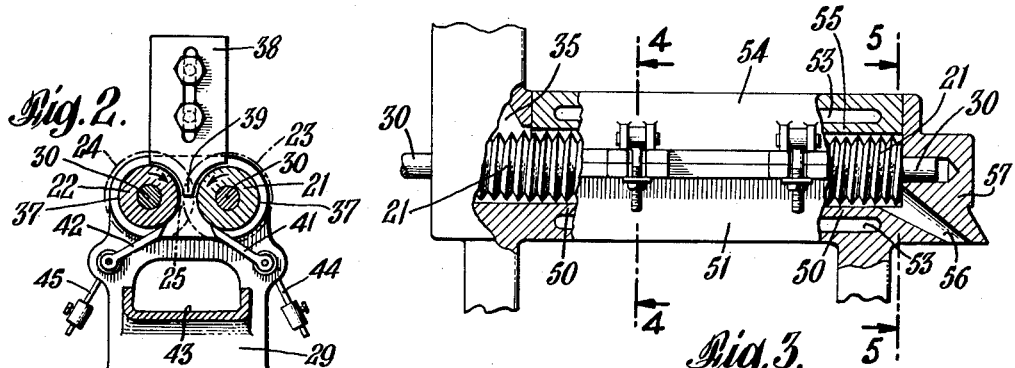
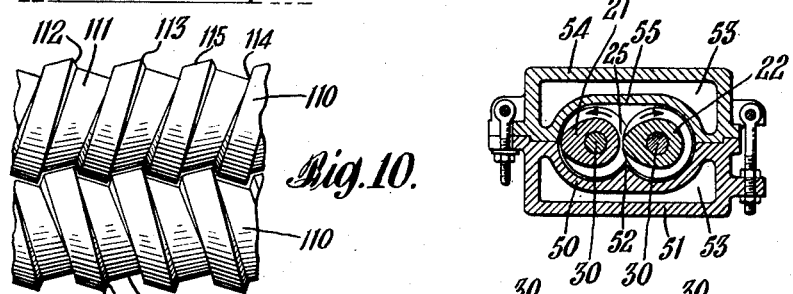
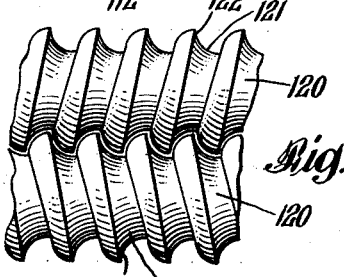
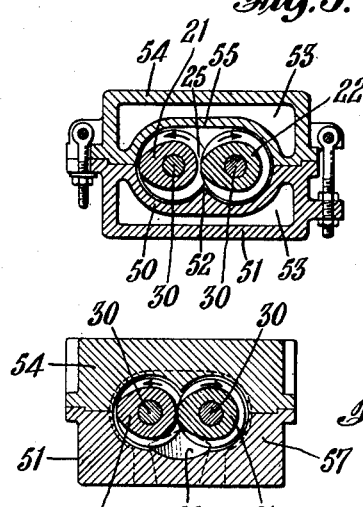
INVENTOR
Walter R. Marshall
BY
*C. C. Scheffler*
ATTORNEY

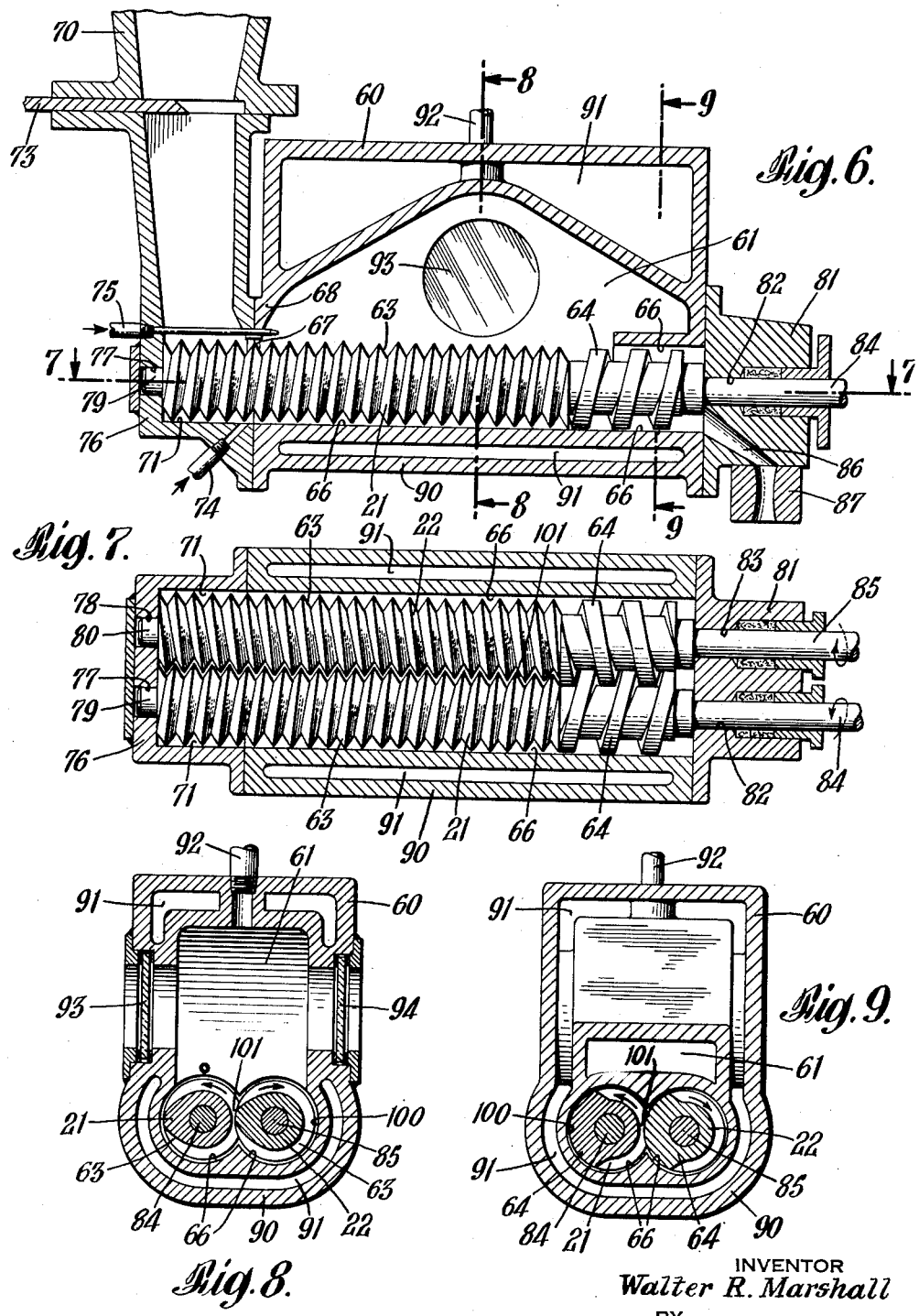

Patented Jan. 20, 1948

2,434,707

UNITED STATES PATENT OFFICE 2,434,707

CONTINUOUS MILLING PROCESS AND APPARATUS

Walter R. Marshall, Bloomfield, N. J., assignor to Bakelite Corporation, a corporation of New Jersey Application October 9, 1943, Serial No. 505,653

10 Claims. (Cl. 18—2)

This invention relates to the milling of plastics, including thermosetting and thermoplastic resins and compositions of them with fillers and other additions, and apparatus therefor.

It is a common practice to mill plastics and compositions containing them by passage through the bite between closely-set oppositely rotating hot or cold rolls; in this way the plastics can be mechanically worked to improve their properties (see U. S. Patent to Allen No. 2,273,822, February 24, 1942), or an intimate blend of resins, of resinous binder and filler, or of admixtures with colors can be secured. This procedure, however, is necessarily a batch operation; and it has the objectionable features associated with the treatment of batches of unavoidable variations in successive batches because of changes in temperature and time periods of rolling, etc.

According to the present invention there is provided a continuous milling of a plastic with the attendant advantages of control, constant operating conditions and uniformity of product. In its simplest embodiment it accomplishes the combined functions of milling and conveying a plastic through the apparatus by means of helically-threaded rolls rotating in opposite directions to draw the plastic tangentially downward into the bite provided by a radial clearance in excess of mechanical clearance in the zone of intermesh between them and so into the helical grooves of the threads to which the plastic adheres and tears apart as the rolls separate for repeated working through the bite; the milling by helical threads in addition secures a blending of various portions of the plastic and thus improves the uniformity of the milled product. In this type more or less of the plastic may lie in the form of milling pools above the bite, and be conveyed along to the discharge end by the helical threads.

It has been found that an improved milling and blending action is secured, in conjunction with conveying, if the bottom portions of the threaded rolls are enclosed by a closely fitting saddle plate and the rolls so rotated that the plastic is drawn upward through the bite of the rolls with the assurance that any pools of excess plastic lying above the bite consist substantially of material milled and blended by passages through the bite. In this form, moreover, the rolls can be completely housed by saddle plates both at the top and the bottom, and the material thus closely confined within the thread grooves.

Some types of plastics are sensitive to air or some contain objectionable amounts of volatiles which are extremely difficult to remove; for example, polystyrene is so characterized. A preferred form of the apparatus is accordingly one that provides a housing enclosing the rolls that includes a chamber for the maintenance or flow of an inert atmosphere and/or the application of a vacuum for the removal of the volatiles.

These embodiments of the invention are illustrated in the accompanying drawing in which Fig. 1 is a vertical longitudinal view partly in section of a continuous milling apparatus;

Fig. 2 is a cross-section on the line 2—2 of Fig. 1;

Fig. 3 is a vertical longitudinal view partly in section of a modification including a saddle plate housing for the lower parts of the rolls;

Fig. 4 is a cross-section on the line 4—4 of Fig. 3;

Fig. 5 is a cross-section on the line 5—5 of Fig. 3;

Fig. 6 is a vertical longitudinal section of another embodiment including a chamber as part of the housing;

Fig. 7 is a horizontal longitudinal section on the line 7—7 of Fig. 6;

Fig. 8 is a cross-section on the line 8—8 of Fig. 6;

Fig. 9 is a cross-section on the line 9—9 of Fig. 6;

Fig. 10 is a fragmentary view of a pair of rolls with a modified V-thread; and

Fig. 11 is a fragmentary view of another V-thread modification.

Turning to the embodiment of Figs. 1 and 2, the essential parts are two parallel rolls 21, 22 of cast iron or other suitable material, with intermeshing helical V-type threads 23, 24, and a clearance 25 between them; these rolls lie with their axes in a horizontal plane. One thread 23 is left-hand or counterclockwise (viewed from the discharge end) and the other thread 24 is right-hand (clockwise); and the rolls are rotated in opposite directions (shown by arrows) so that the intermeshing surface areas move together downwardly to provide the bite.

The rolls are supported at each end in bearings 26, 27 by pedestals 28, 29. Shafts 30 extend from the rolls and carry intermeshing gears 31 driven by a gear 33 and motor 34.

Material is fed to the top of the bite provided by the radial clearance in excess of mechanical clearance between the rolls in the zone of intermesh from a hopper 35 and the rate of feed can be controlled by a gate 36. At the discharge end the rolls are plain without any thread as shown at 37. A check plate 38 is adjustably supported from the pedestal 29, and it has a tongue 39 fitting into the space between the rolls to prevent further onward progress of material. Knives 41, 42, supported by the pedestal 29, scrape against the smooth sections 37 of the rolls to remove the milled material into a pan 43 carried by the pedestal underneath the rolls. Weighted arms 44, 45 press the knives against the roll sections 37.

The embodiment of Figs. 3 to 5 has in addition to the rolls 21, 22, a saddle plate 50 formed as part of a housing 51 enclosing the lower parts of the rolls. The saddle plate is shaped to give a small clearance about the rolls and with an edge 52 projecting into the space between the rolls to thus confine material to the thread grooves. A chamber 53 for heating (or cooling) fluid is provided in the housing. A removable top section 54 is also shown with a straight wall conformation 55 so that the rolls can be enclosed on the top as well as on the bottom. An opening 56 through the end wall 57 of the housing 51 is provided for the discharge of milled material into a pan. In this form of apparatus the rolls are preferably rotated so as to draw material upward through the bite; by this means the tendency to form sizable pools at the bite entrance is prevented by the edge 52 of the saddle plate 50.

The preferred embodiment is disclosed in Figs. 6 to 9 in which the horizontal rolls 21, 22 are completely enclosed by a housing 60 having above the milling section of the rolls a chamber 61 which can be evacuated and/or an inert atmosphere maintained therein.

In this form the threads on each roll are preferably divided into two sections 63, 64, each of a different type; the major section 63 consists of V-threads for milling and extends about three-fourths of the length, while the remaining or minor section 64 has square threads for pumping. Both rolls are supported in the cast iron housing for rotation in a saddle-shaped dual bore 66, and of a diameter to closely accommodate the rolls; but above the thread sections 63 a portion of the saddle-shaped dual bore in the block is absent to open into the chamber 61. The dual boring extends through an opening 67 in the wall 68 of the block to completely and closely encircle the rolls at that end; and the square threads 64 on the discharge end are fully enclosed by the dual bore 66.

At the entrance end to the block or housing there is secured a cast iron hopper 70 with a saddle-shaped dual bore 71 forming a continuation of that of the block or housing 60. An adjustable gate 73 controls the feed of material to the hopper, a port 74 provides for the injection of other materials, and an inlet 75 is for the introduction of inert gas. Formed in the outer hopper wall 76 are bearings 77, 78 for receiving stub shafts 79, 80 on the rolls 21, 22.

At the discharge end of the block there is secured a casting 81 with bearings 82, 83 for receiving shaft extensions 84, 85 of the rolls 21, 22. These shafts extend through other bearings and are driven through timing gears, reduction gearing and a motor as illustrated in Fig. 1. The casting has a discharge port 86 opening into the bore 66 of the block; any desirable form of die block or manifold-extruding head 87 can be attached to the port 86 through which the material is extruded or forced by the positive pumping action of the square thread sections 64 of the rolls.

The block 60 has a jacket 90 enclosing a space 91 for receiving heating fluid. An outlet 92 extends from the top of the chamber 61 through the jacket 90 and a condenser and vapor or gas handling train and vacuum pump can be connected to the outlet. Sight glasses 93, 94 in the sides of the block permit inspection while the machine is in operation.

It is preferable that the lower halves at least of the rolls 21, 22 be bounded throughout their length by the saddle-shaped dual bore 66 as shown in Fig. 8; and the clearance 100 between the screw thread crests and the wall of the bore is kept low to prevent slippage past the rolls. Likewise the radial clearance 101 in excess of mechanical clearance between the intermeshing screw threads is kept as low as is consistent with the degree of milling required and permitted by the material. For operating on polystyrene, it has been found that these clearances should be about 0.005–0.050 inch.

In the operation of any of the embodiments, polystyrene (or other plastic) is fed into the hopper at the inlet end from some suitable source or by hand; since the milling is continuous, it is highly desirable that the feed also be continuous, and the rate can be controlled by the adjustable gate. The material is carried from the hopper by the rotating rolls in the thread grooves; and it is caught in the bite provided by the radial clearance between the rolls and extruded through the small clearance as a plastic sheet or ribbon which clings to the rolls and is torn apart as the rolls separate to be carried back around to the bite and the cycle repeated. In the tearing apart a multitude of fine filaments are formed which bridge the crests of the separating screw threads and vastly increases the exposed surface of the milled plastic to facilitate the blending of the mass.

In the first embodiment excess material not drawn through the thread clearance tends to lie in pools in the thread grooves and these pools are conveyed forward under the urge of the advancing helix. But as the rotating thread completes a rotation it cuts into a pool, loses some of its load to the pool, and the pool surrenders some of its mass to the moving thread to carry new material through the extruding slot for milling into a thin ribbon or film. There is thus a continuous milling and blending throughout the material mass as it is conveyed along the rolls.

With the close-fitting saddle plate extending about the lower part of the rolls of the second embodiment, an improved milling and blending action is obtained by rotating the rolls so as to extrude upwardly through the roll clearance. The edge 52 of the saddle plate projecting into the space between the rolls confines the plastic to the thread grooves and so minimizes the separation or formation of pools. With the cover plate 54 applied, the rolls are completely enclosed, and the plastic can be kept out of contact with air or dust during the milling.

The preferred form is particularly useful for the removal of volatiles from plastics. When the upwardly extruded plastic film or ribbon is torn apart into fine filaments by the separating of the rolls, the greatly increased surface promotes the escape of volatiles; and removing the escaped volatiles by sweeping a gas through the chamber 61 further enhances the purification. The maintenance of a vacuum greatly accelerates the release of volatile; and the practice followed is that of maintaining as full a vacuum as can be obtained, i. e. 29.0 to 29.9 inches of mercury.

For removing the milled and devolatilized material from the block or housing 60 a positive discharge, i. e. a positive displacement with a minimum of back slippage, is desirable. For this purpose there should be close thread-to-wall clearance so that there is no place for the material to go but along the thread grooves; this is obtained by completely enclosing the discharge end of the rolls by the saddle-shaped dual bore as shown in Fig. 9. For a positive displacement through the bore square threads, or threads approaching a square cross-section, are effective and for that reason selected. By this means the outlet port is forced full of plastic and it constitutes a hermetic seal; similarly the incoming plastic from the hopper hermetically seals the intake through the opening 67, and a high vacuum within the chamber 61 is thus made possible.

The milling and conveying action of the rolls, secured by the straight-sided V-type thread can be improved by types of threads comprising modifications of the V-thread, such as rounding or flatting the crest and the bottom of the groove or changing the angle of the sides. Particularly effective are threads illustrated in Figs. 10 and 11.

The thread 110 of Fig. 10 has an inclined flat extended bottom 111 and a side 112 forming a groove 114 with and approaching the perpendicular to the bottom 111 but at an angle somewhat greater than 90° and having necessary the same angular relation to an inclined top surface 115 to form a crest 113 with the side 112 and so avoid a straight shearing action; by this construction the milling action by the crest 113 in the groove 114 is substantially obtained, while the perpendicular side 112 gives an onward propulsive action. A sharp edge at the crest 113 is preferred for scraping the wall of the bore and maintaining it free of material.

The thread 120 of Fig. 11 is in effect and action similar to that of Fig. 10. By curving the bottom 121 into the side 122, the tendency for the lodging of material in the angle between the bottom and the side is minimized.

In general, the operation depends upon securing or maintaining a viscous liquid condition of the plastic. For highly polymerized styrene of about 97+ per cent polymer and an average molecular weight around 50,000 to 100,000, this condition is obtained by heating with hot fluid, such as oil, circulating through the heating jacket to about 190°–225° C. For other plastics, such as polystyrene-polyisobutylene mixes, it is sufficient to pass through steam at about 100 pounds pressure. With some plastics or compositions the milling action in itself may produce sufficient heat to cause the plasticizing of the mass. When more heat-sensitive plastics, such as phenolic resin molding materials, are milled, cooling even may be required; for this purpose the rolls can be made hollow for the circulation of liquid which is a common and well-known expedient in milling rolls.

The data of the following table demonstrate how the equipment herein described causes improvements in the properties of plastics that cannot be realized with standard rolling in air at normal temperature and pressure. The data were obtained with the preferred form of apparatus on a 96 per cent polystyrene with an average molecular weight of 92,500 and a flow time of 66 seconds determined by a Rossi-Peakes flow tester (described in U. S. Patent No. 2,066,016, December 29, 1936) under a pressure of 1000 pounds per square inch and a temperature of 135° C. for traveling the length (1.5 inches) of the ⅛ inch bore of the tester. The flow time in reality is a viscosity determination, but residual liquids in the polystyrene tend to lubricate and so reduce the flow time (the usual viscosity measurements are by means of solutions and these do not disclose the presence of contaminating liquids); the flow time accordingly is a convenient means for determining the extent to which liquids or low viscosity constituents are present to lower the softening point and the strength properties of the polymerized styrene.

Table

| Sample No. | Conditions of Milling | | | Product Leaving Rolls | | |
|---|---|---|---|---|---|---|
| | Vac. | Gas Envelope | | Per cent Insoluble | Mol. Wt. | Flow in Sec. |
| | | Kind | Volume | | | |
| | | | Cc./sec. | | | |
| a | 29.7 | N₂ | 80 | 99.1 | 90,800 | 432 |
| b | 29.7 | N₂ | 80 | 99.4 | 92,000 | 485 |
| c | 29.8 | N₂ | 80 | 99.0 | 97,000 | 516 |
| d | 0 | N₂ | 80 | 98.4 | 101,900 | 313 |
| e | 0 | Air | 80 | 98.2 | 49,700 | 146 |
| f | 0 | Air | 20 | 98.0 | 53,900 | 123 |
| g | 29.0 | Air | 20 | 99.2 | 93,500 | 465 |
| h | 29.0 | Air | 80 | 99.1 | 91,300 | 447 |
| i | 29.0 | N₂ | 80 | 98.8 | 97,200 | 501 |

In the table submitted, samples e and f were rolled continuously in a moving air stream at atmospheric pressure in contrast to all the other samples which were milled in a moving air or nitrogen stream at the lowest gas pressure (highest vacuum) obtainable in the system. The machine, by attenuating the gas envelope, even renders air innocuous as shown by comparing samples g and h with e and f; and the profound drop in both molecular weight and flow time when air at normal pressures is present to react with the hot polymer clearly brings out the advantages inherent in the apparatus.

The threaded-roll mill unit, while developed specifically for removing volatiles from polystyrene, is applicable to the processing of other plastic materials or compositions containing them. Milling operations are general in the plastics industry, and continuous milling in a controlled atmosphere has a wide range of usefulness. The machine has been used successfully in compounding polyisobutylene and polystyrene, vinylite with a plasticizer, mixed compositions designed for cable insulation, etc. Again, in the compounding of certain synthetic rubbers, particularly the Buna-S type, a reduction in processing time can be gained by carrying out the breakdown in an atmosphere richer in oxygen than ordinary air; this likewise is operable with the continuous milling rolls.

The machine also lends itself to continuous incorporation of colors as dyes or pigments. This is done by continuously pumping in a measured amount of a solution or suspension of dyes or pigments through the port 14 by means of a pumping device not shown; this means of coloring has been demonstrated as entirely successful on various color mixes.

What is claimed is:

1. Apparatus for milling and conveying a plastic comprising in combination a pair of parallel horizontal rolls having intermeshing left- and right-handed helical threads, said threads having a V-shape for a major portion of the length of the rolls and a square shape for the minor terminal portions of the rolls, a housing enclosing and supporting the rolls, said housing including a saddle plate extending in part at least about the V-shaped threads of the rolls with an edge projecting into the space between the rolls and completely encircling the square-thread portion, and means for rotating the rolls in counter directions.

2. In an apparatus for milling and conveying a plastic by means of parallel horizontal rolls having intermeshing helical surfaces, each of said surfaces being of a V-shape in axial cross-section having a groove for receiving the plastic, a crest of a shape complementary to the groove of the intermeshing roll surface but with a radial clearance in excess of mechanical clearance between them in the zone of intermesh to form a bite for milling the plastic and a side connecting the groove and the crest for conveying the plastic longitudinally of the roll.

3. In an apparatus for milling and conveying a plastic by means of parallel horizontal rolls having intermeshing helical surfaces, each of said surfaces being of a V-shape in axial cross-section and having a groove with an inclined flat bottom, a crest of a shape complementary to the groove of the intermeshing roll surface but providing a clearance to form a bite for milling the plastic, and a side connecting the groove bottom and the crest.

4. In an apparatus for milling and conveying a plastic by means of parallel horizontal rolls having intermeshing helical surfaces, each of said surfaces being of a V-shape in axial cross-section having a groove, a side to the groove with a rounded connection to the bottom of the groove, and a crest of a shape complementary to the groove of the intermeshing roll surface but providing a clearance to form a bite for milling the plastic.

5. Apparatus for milling and conveying a plastic comprising in combination a pair of parallel horizontal rolls having intermeshing left- and right-handed helical threads of a V-shape in axial cross-section with a radial clearance in excess of mechanical clearance between the threads in the zone of intermesh to form a bite for the passage of the plastic, a housing enclosing and supporting the rolls, said housing having a chamber open to the rolls and including a saddle plate having a dual bore closely accommodating the rolls to form an edge projecting into a non-intermeshing space between the rolls and said plate extending in part about the rolls, and means for rotating the rolls in counter directions and away from the projecting edge on the saddle plate.

6. Apparatus for milling and conveying a plastic comprising in combination a pair of parallel horizontal rolls having intermeshing left- and right-handed helical threads of a V-shape in axial cross-section with a radial clearance in excess of mechanical clearance between the threads in the zone of intermesh to form a bite for the passage of the plastic, a support for the rolls including a saddle plate having a dual bore closely accommodating the rolls to form an edge projecting into a non-intermeshing space between the rolls and said plate extending in part at least about the rolls, and means for rotating the rolls in counter directions and away from the projecting edge on the saddle plate.

7. Apparatus for milling and conveying a plastic comprising in combination a pair of parallel horizontal rolls having intermeshing left- and right-handed helical threads of a V-shape in axial cross-section with a radial clearance in excess of mechanical clearance between the threads in the zone of intermesh to form a bite for the passage of the plastic, a support for the rolls, and means for rotating the rolls in counter directions.

8. In a process for milling a volatile-containing plastic by parallel horizontal rolls having intermeshing helical threads of a V-shape in axial cross section with a radial clearance in excess of mechanical clearance between the threads in the zone of intermesh to form a bite for the passage of the plastic and a closed housing about the rolls having a chamber open to the rolls and a saddle plate formation extending in part about the rolls and provided with an edge projecting into a non-intermeshing space between the rolls, the steps which comprise feeding the plastic to the rolls within the housing, reducing the plastic by rotating the rolls in counter directions to draw the plastic into the bite from the space into which the edge projects and to tear apart the plastic upon emerging from the bite to release volatile while conveying the plastic longitudinally of the rolls by the rotation, and sweeping an inert atmosphere through the chamber of the housing to carry off released volatile.

9. In a process for milling a plastic by parallel horizontal rolls having intermeshing helical threads of a V-shape in axial cross-section with a radial clearance in excess of mechanical clearance between the threads in the zone of intermesh to form a bite for the passage of the plastic and a saddle plate extending in part at least about the rolls and having an edge projecting in a non-intermeshing space between the rolls, the steps which comprise feeding the plastic to the rolls, reducing the plastic by rotating the rolls in counter directions to draw the plastic into the bite from the space into which the edge projects and to tear apart the plastic upon emerging from the bite while conveying the plastic longitudinally of the rolls by the rotation.

10. In a process for milling a plastic by parallel horizontal rolls having intermeshing helical threads of a V-shape in axial cross-section with a radial clearance in excess of mechanical clearance between the threads in the zone of intermesh to form a bite for the passage of the plastic, the steps which comprise feeding the plastic to the rolls, reducing the plastic by rotating the rolls in counter directions to draw the plastic into the bite and to tear apart the plastic upon emerging from the bite by continued rotation and adherence of the plastic to the separating helical threads while conveying the plastic longitudinally along the rolls by the rotation.

WALTER R. MARSHALL.

REFERENCES CITED

The following references are of record in the file of this patent:

UNITED STATES PATENTS

| Number | Name | Date |
| --- | --- | --- |
| 2,048,286 | Pease | July 21, 1936 |
| 2,119,162 | Hartner | May 31, 1938 |
| 2,175,054 | Ferngren | Oct. 3, 1939 |
| 1,211,370 | Price et al. | Jan. 2, 1917 |
| 2,170,303 | Helstrup | Aug. 22, 1939 |